United States Patent [19]

Curtiss, Jr.

[11] 3,780,783
[45] Dec. 25, 1973

[54] TRIANGULATED CARCASS TIRE
[75] Inventor: Walter W. Curtiss, Jr., Brimfield, Ohio
[73] Assignee: The Goodyear Tire & Rubber Company, Akron, Ohio
[22] Filed: May 31, 1972
[21] Appl. No.: 258,109

[52] U.S. Cl. .............................................. 152/356
[51] Int. Cl. ............................................. B60c 9/10
[58] Field of Search .................... 152/356, 355, 354

[56] References Cited
UNITED STATES PATENTS
| 3,672,423 | 6/1972 | Duduk | 152/356 |
| 2,493,614 | 1/1950 | Bourdon | 152/356 |
| 3,605,849 | 9/1971 | Boileau | 152/356 |
| 2,700,998 | 2/1955 | Wallace | 152/356 |
| 1,132,634 | 3/1915 | Subers | 152/354 |
| 2,432,630 | 12/1947 | Purdy | 152/356 |

Primary Examiner—Robert G. Sheridan
Assistant Examiner—Robert Saifer
Attorney—F. W. Brunner et al.

[57] ABSTRACT

A pneumatic tire having three plies of tire cord fabric in which the cords in two of the plies follow a geodesic cord path and the cords in the third ply follow a conventional cord path. The individual cords in all of the plies are of the same length and each ply has its radially inner ends turned about the respective bead core.

11 Claims, 6 Drawing Figures

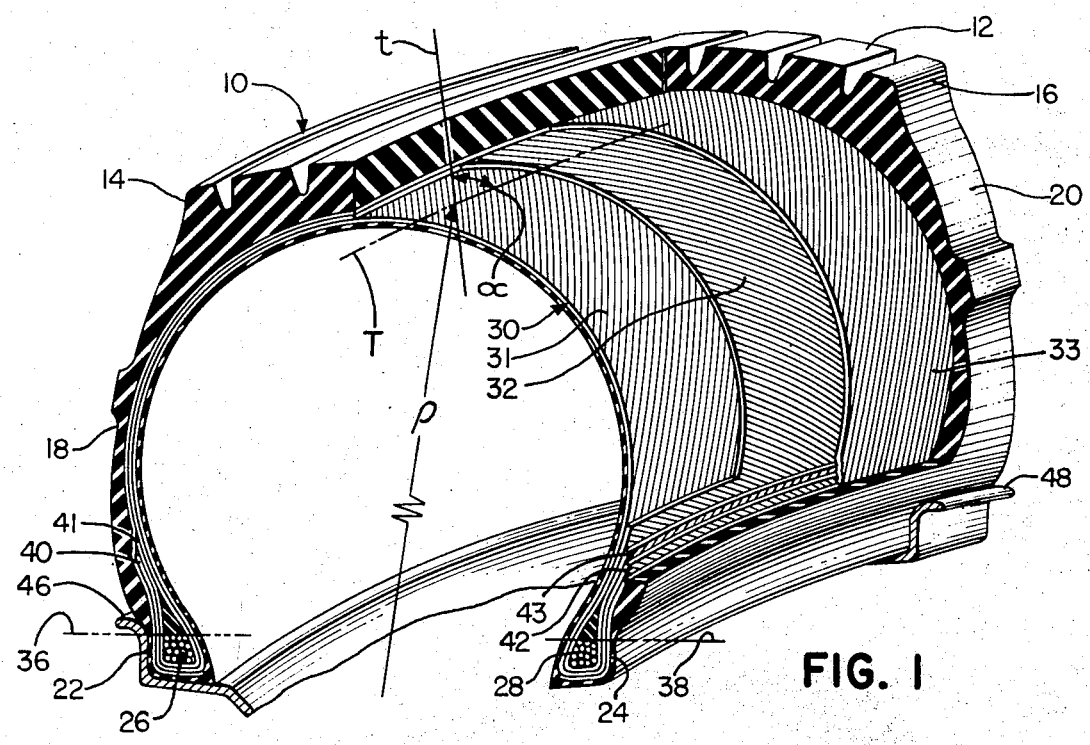
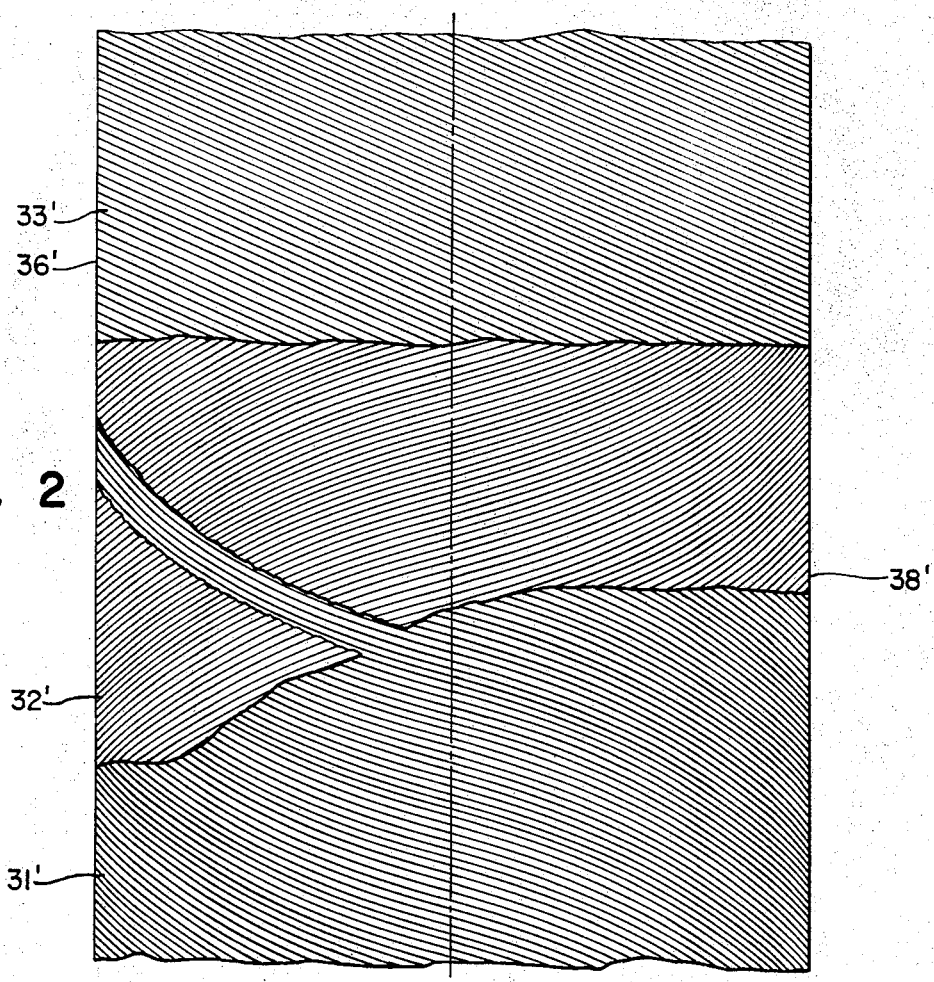
FIG. 1
FIG. 2

TRIANGULATED CARCASS TIRE

This invention relates to pneumatic tires and more particularly to a specific arrangement of cord paths in the carcass plies to provide optimum operational characteristics.

Some of the most desirable properties of a pneumatic tire are: a rigid or stiff tread portion to provide good skid resistance and treadwear; flexible sidewalls to provide a smooth comfortable ride; rigid lower sidewall regions to provide good lateral stability and response in cornering or in turns; no free or loose ply ends of belt edges in order to provide maximum durability. The present invention provides all of these qualities in a single tire by utilizing unique carcass cord angle arrangements with all such cords being of equal length and tied into the bead cores.

It is an object therefore of the present invention to provide a pneumatic tire having optimum operational characteristics. It is a further object of the present invention to provide a pneumatic tire having optimum durability, treadwear, skid resistance, softness of ride and good lateral stability or steering response.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

With reference to the drawings:

FIG. 1 is a perspective view of a portion of a tire constructed in accordance with the present invention with portions cut away;

FIG. 2 is a plan view of three flat plies of unvulcanized tire cord fabric utilized in constructing the tire of FIG. 1;

Figure 3:
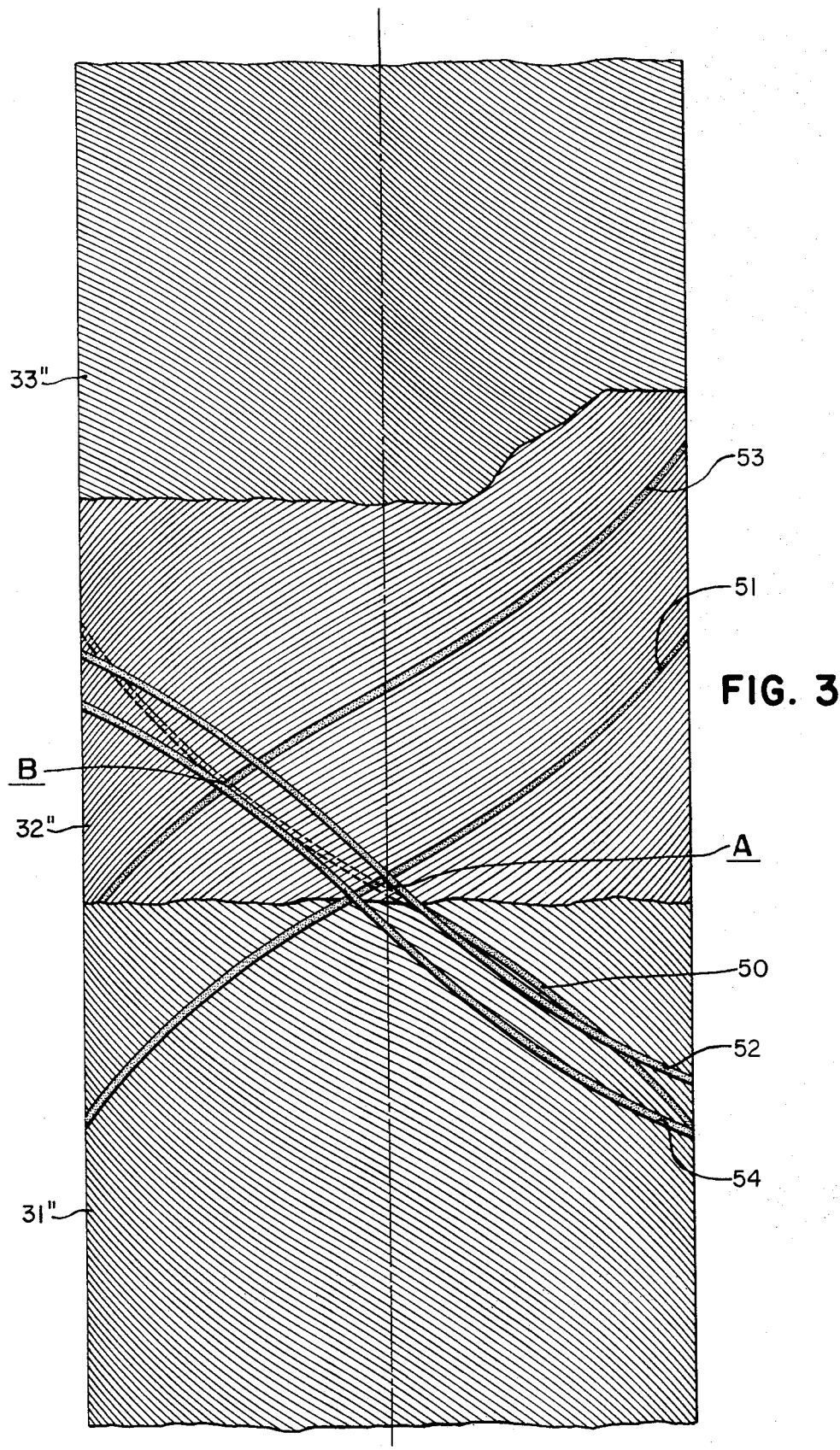
FIG. 3 is a plot illustrating the cord angle relationships in the three plies from bead to bead in the tire of FIG. 1.

With reference to the drawings and in particular FIG. 1 there is illustrated a tire 10 constructed in accordance with the present invention, which includes a generally cylindrical tread portion 12 terminating at its lateral edges in shoulder regions 14 and 16. A pair of sidewall portions 18 and 20 extend radially inwardly from the respective shoulder 14, 16 and terminate at their radially inner ends in bead portions 22, 24. Each bead portion 22, 24 includes an inextensible bead core 26, 28. A carcass structure 30 comprising three plies of tire cord fabric 31, 32 and 33 extend circumferentially about the tire and from bead to bead. The cords in the plies may be of any suitable material such as, by way of example only, polyester, nylon, rayon or wire.

In accordance with the the present invention the cords in all the three plies of tire cord fabric are tied into the bead cores 26, 28. That is, the radially inner ends are wrapped at least partially about the respective bead core 26 or 28. Also in accordance with the present invention the cords in all of the carcass plies 31, 32, 33 are, within the practical limits of tire design and manufacturing, of the same length between the beads. That is, the lengths of all cords in the plies 31, 32, 33 from a line 36 (tangent to the radially outer surface of one bead core 26 and parallel to the rotational axis of the tire) to a line 38 (tangent to the radially outer surface of the opposite bead core 28 and parallel to the rotational axis of the tire) are the same.

In the particular embodiment illustrated the carcass plies 31 and 32 have their cords following a geodesic cord path but extend in opposite directions with respect to the mid-circumferential centerline of the tire. For purposes of this invention the mid-circumferential centerline of the tire shall be construed to mean a line extending circumferentially about the tire, through the cord in question and lying in a plane which is disposed midway between the bead cores 26 and 28 and perpendicular to the rotational axis of the tire. Also, and as seen in FIG. 1, for purposes of this invention the cord angle of a ply or a cord in a ply shall be the acute angle $\alpha$ between the line $t$ tangent to the cord at the point in question and a tangent T to a circle which passes through the point in question, said circle having a radius $\rho$ perpendicular to the rotational axis of the tire and its center coincident with the rotational axis of the tire.

The geodesic cord path of plies 31 and 32 is defined by the equation $\rho \cos \alpha = $ a constant, where the constant equals the value of $\rho \cos \alpha$ at the mid-circumferential centerline. Further, the conventional cord path in the ply 33 is that which appears in conventional bias ply carcasses known in the art today and is defined by the equation $1/\rho \cos \alpha = $ a constant, where the constant equals the value of $1/\rho \cos \alpha$ at the mid-circumferential centerline.

The value of $\alpha$ and $\rho$ at the mid-circumferential centerplane is determined by the tire engineer and dependent upon the specific operational characteristics desired. They are, however, chosen for both the geodesic and conventional plies such that the length of the cords in all three plies will be the same.

Further, in accordance with the present invention, the two geodesic cord plies 31 and 32 have their respective radially inner ends 40, 41 and 42, 43 turned axially outwardly about the respective bead cores 26, 28 and extend radially outwardly a short distance beyond the respective rim flange 46, 48. The outer ply 33 overlaps the turned-up portions 40, 41 and 42, 43 of the inner plies 31 and 32 and is turned axially inwardly at least partially about the respective bead core 26, 28 to provide a firm tie-in or connection therewith. It can be seen, therefore, that in the particular embodiment illustrated in FIG. 1 there are no loose ends in any flexing portion of the tire to provide any possible danger of component separation.

With reference to FIG. 2 the three plies 31', 32' and 33' of the tire of FIG. 1 are illustrated in the uncured flat configuration they are in as they are applied to a conventional cylindrical tire building drum. The specific cord path of each ply as it is wrapped about the tire building drum is determined by using the cosine law of pantographing wherein $\gamma \cos \alpha = \rho \cos \rho$ along with the proper factors for stretch and slip for the specific situation. In this equation $\alpha$ and $\rho$ are as defined in the above geodesic and conventional cord path equations, $\gamma$ is the radius of the tire building drum at the point in question and $\beta$ is the cord angle at the point in question on the flat tire building fabric.

Figure 4:
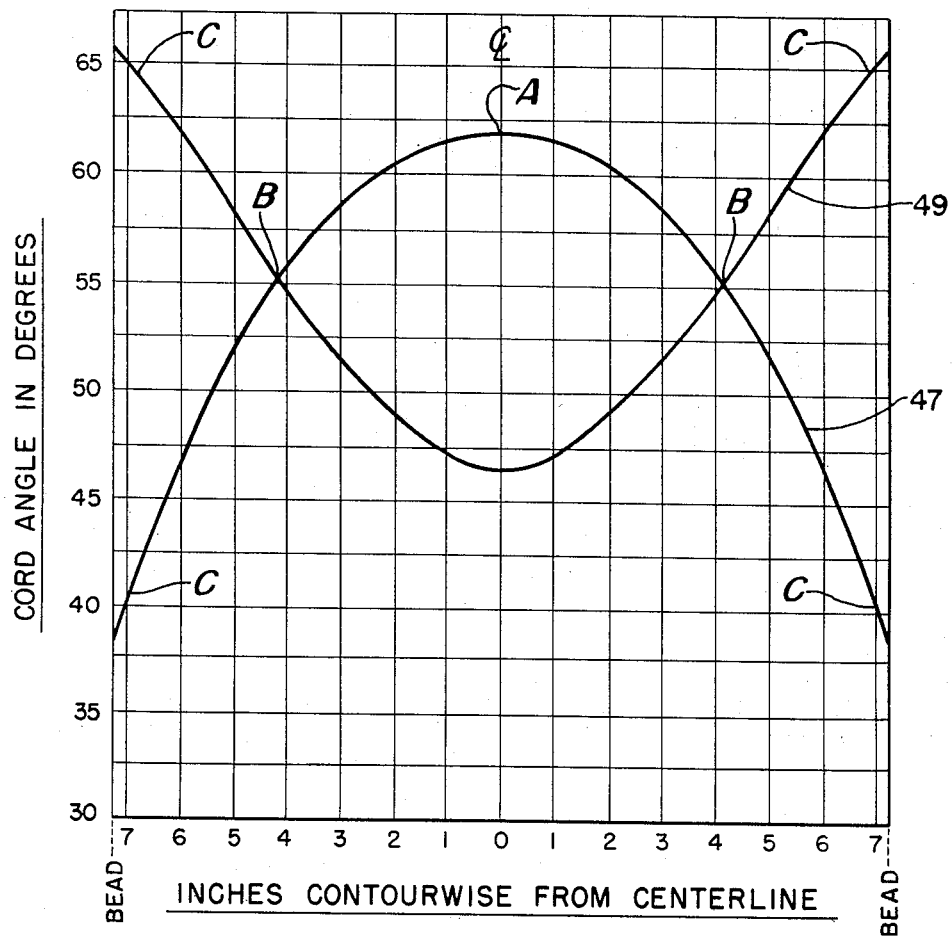
FIG. 4 is a graph illustrating the magnitude of the cord angles of the cords in the three plies of the tire of FIG. 1 as the cords progress from one bead across the tread to the other bead.

With reference to FIG. 4, the magnitudes of the cord angles of the cords in the plies 31, 32, 33 are illustrated on a graph. The curve 47 is the plot of the cord angles of the cords in the plies 31 and 32 between the tangent lines 36 and 38. It will be appreciated that while the magnitudes of the cord angles are equal at corresponding points in the tire in both plies 31 and 32 that they are inclined in opposite directions with respect to the mid-circumferential centerline and are thus crossed with respect to each other. The plies 31, 32, 33, therefore, successively extend in alternating directions with respect to the mid-circumferential centerline and each ply has a different cord angle with respect to the other two at said centerline. The curve 49 is a plot of the cord angles of the cords in the ply 33 between the tangent lines 36 and 38.

With reference to FIG. 2, the portion of the plies 31, 32 and 33 between the tangent links 36' and 38' (corresponding to 36 and 38 in FIG. 1) are illustrated as uncured flat plies 31', 32' and 33', respectively, which are utilized in building the tire of FIG. 1. In the particular embodiment illustrated the uncured plies 31' and 32', which form the geodesic cord path plies 31 and 32 have a curved cord path with the cord angle at the centerline being equal to approximately 75° and diminishing to approximately 43° in the area to be located just radially outwardly of the bead cores 26 and 28. The cord path of the ply 33', which becomes the conventional cord path in the shaped pneumatic tire, is straight and at an angle of approximately 68°.

The tire 10 is built on a conventional cylindrical tire building drum (not shown) and then shaped to a toroidal form and cured in a tire curing press in a manner known in the art. When the cylindrical tire is shaped to the toroidal form the cords pantograph and assume the respective geodesic and conventional cord path configurations described above. The relative cord angles that the three plies assume when shaped to the toroidal form are plotted in a plane view illustrated in FIG. 3 and designated 31", 32", and 33". Individual cords 50, 51 and 52 in the respective plies 31", 32" and 33" are illustrated superposed on top of each other in extra heavy lines and generally intersecting in the area of the mid-circumferential centerline to show the relative cord paths of the cords in the three carcass plies. Additional cords 53 and 54 from the plies 32" and 33" intersecting the cord 51 in the area of the sidewall at point B are illustrated in heavy lines.

Figure 6:
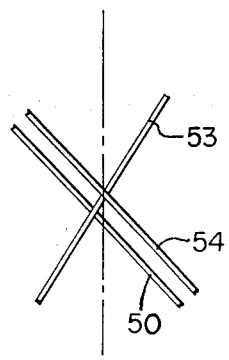
FIG. 6 is a view of one cord from each of the three plies as they would appear at point B on the graph of FIG. 4.
Figure 5:
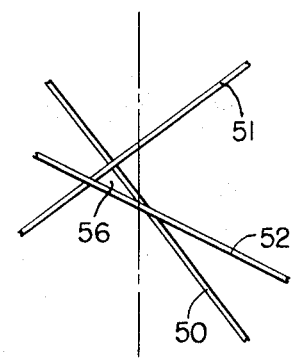
FIG. 5 is an enlarged view of one cord from each of the three plies as they would appear at point A on the graph of FIG. 4.

With reference to FIG. 5, the intersection of the cords 50, 51 and 52 at A is illustrated in an enlarged view. It can be seen that these cords as they cross each other in the general area of the mid-circumferential centerline form a triangle 56. This triangulation of the cord plies in the area of the tread provides a very rigid or stiff tread structure which results in good skid resistance and wear properties. By contrast, however, as illustrated in FIG. 6, the relative paths of the cords 50, 53 and 54 show that there is no triangulation of the plies at the point B in the sidewall. This results in a more flexible sidewall and ultimately a softer riding tire. Referring again to FIG. 4, it will be appreciated that where the magnitude of the cord angles of the various plies are equal (points B) the carcass structure is quite flexible. However, since the difference between the magnitude of the cord angles in the geodesic cord plies and the conventional cord plies becomes progressively greater toward the point A and toward the bead areas, the cords become increasingly more triangulated thus resulting in increasing stiffness of the carcass sructure until the maximum stiffness is reached at the point A in the tread area and at points C adjacent the bead areas. From the foregoing discussion of the varying triangulation between the cord plies, it can be seen that the tire illustrated in FIG. 1 and graphically described in FIG. 4, results in a tire which has maximum flexibility in the sidewall areas with increased stiffness or rigidity in the tread areas and in the lower sidewall regions adjacent the beads. The stiff or rigid tread area again provides the good tread wear and skid resistance while the flexible middle zones of the sidewall provides riding comfort. The increased stiffness adjacent the bead areas provides lateral stability and cornering force to improve the handling of the vehicle. It can be seen, therefore, that the relative stiffness and flexibility in the various zones of the tire has been provided without the use of additional reinforcing layers, such as belts, breakers, chippers or flippers.

While in the specific embodiment illustrated, two geodesic cord ply paths and one conventional cord ply path are utilized, it will be appreciated that the cord paths can be varied from the pure geodesic and pure conventional cord paths so long as the length of the cords in the various plies are equal and the plies are tied into the bead cores 26, 28. For purposes of this invention two plies shall be considered to have different cord paths if their cord paths are defined by different mathematical equations as opposed to being defined by the same mathematical equation but either having different cord angles at the midcircumferential centerline or extending in alternate directions.

A modification might include providing a wider area in the sidewall region at which the magnitudes of the cord angles of the three plies are equal, thus providing a wider flex zone in the sidewall. It may further be desirable to increase or decrease the magnitude of the difference between the cord angles of the various plies in the tread zones or lower sidewall zones; however, in order to provide sufficient triangulation in these zones one ply should have a cord angle which is at least 5° different from the other two.

It will be further appreciated that while in the specific embodiment illustrated only three plies are utilized that additional plies could be provided. Also while it has been stated that additional reinforcing plies such as belts, breakers, chippers and flippers are not required, this is not to preclude one from adding such reinforcing plies if he so desires.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread portion, a pair of sidewalls, a pair of inextensible bead cores and a carcass including three plies of tire cord fabric with one ply of said three plies having a different cord path relative to the other two plies of said three plies and the cords in all of the plies of said three plies being of the same length.

2. A tire as claimed in claim 1, wherein the radially inner ends of each of the three plies of tire cord fabric are turned at least partially about the respective bead core.

3. A tire as claimed in claim 1, wherein two of the plies have cord angle magnitudes which are correspondingly equal but extend in respectively opposite directions with respect to the mid-circumferential centerline of the tire.

4. A tire as claimed in claim 1, wherein the cord path of two of the plies is defined by the equation $\rho \cos \alpha =$ a constant and the third ply of said three plies of tires has a cord path defined by the equation $1/\rho \cos \alpha = $ a constant.

5. A tire as claimed in claim 1, wherein the cord paths of said three plies of tire cord fabric are such that there is a point in the sidewall at which there is no triangulation of the cord fabric and the cord paths become progressively more tiangulated as they progress further toward the centerline of the tire and the bead portion of the tire from said point in the sidewall.

6. A tire as claimed in claim 3, wherein the radially inner ends of each of the three plies of tire cord fabric are turned at least partially about the respective bead core.

7. A tire as claimed in claim 4, wherein the radially inner ends of each of the three plies of tire cord fabric are turned at least partially about the respective bead core.

8. A tire as claimed in claim 5, wherein the radially inner ends of each of the three plies of tire cord fabric are turned at least partially about the respective bead core.

9. A pneumatic tire including a tread portion, a pair of sidewalls, a pair of inextensible bead cores and three plies of tire cord fabric wherein the cords in all of the plies of said three plies are of equal length, the magnitude of the cord angle of one ply of said three plies of tire cord fabric is different from the magnitude of at least one of the other plies of said three plies of tire cord fabric by at least 5° at the midcircumferential centerline and at a point in the lower sidewall area of the tire, and the magnitude of the cord angles of all the plies of said three plies of tire cord fabric are substantially equal at a point in the sidewall radially outwardly of said point in the lower sidewall area.

10. A tire as claimed in claim 9, wherein the cords in all of the plies of said three plies of tire cord fabric are of equal length.

11. A tire as claimed in claim 9, wherein the radially inner ends of each ply of said three plies of tire cord fabric have their radially inner ends turned at least partially about the respective bead core.

* * * * *

UNITED STATES PATENT OFFICE
CERTIFICATE OF CORRECTION

Patent No. 3,780,783    Dated December 25, 1973

Inventor(s) Walter W Curtiss, Jr

It is certified that error appears in the above-identified patent and that said Letters Patent are hereby corrected as shown below:

The following paragraph was omitted and should be inserted after the abstract of the disclosure:

"The foregoing abstract is not to be taken as limiting the invention of this application, and in order to understand the full nature and extent of the technical disclosure of this application, reference must be made to the accompanying drawings and the following detailed description."

Column 1, line 12 "of" should be -- or --.

Column 1, line 16, "such" should be omitted.

Column 2, line 66 "$\cos \rho$" should be -- $\cos \beta$ --.

Column 3, line 22 "links" should be -- lines --.

Column 3, line 48 "tbe" should be -- the --.

Column 3, line 58 "tbe" should be -- the --.

Column 4, line 52 "tbat" should be -- that --.

Column 4, line 61 "tbe" should be -- the --.

Signed and sealed this 6th day of August 1974.

(SEAL)
Attest:

McCOY M. GIBSON, JR.
Attesting Officer

C. MARSHALL DANN
Commissioner of Patents